United States Patent
Tanaka et al.

(10) Patent No.: US 11,592,064 B2
(45) Date of Patent: Feb. 28, 2023

(54) BEARING UNIT MANUFACTURING DEVICE AND BEARING UNIT MANUFACTURING METHOD

(71) Applicants: JTEKT CORPORATION, Osaka (JP); TOYOTA JIDOSHA KABUSHIKI KAISHA, Toyota (JP)

(72) Inventors: Yosuke Tanaka, Ikoma-gun (JP); Masato Nakagawa, Chita-gun (JP); Masato Fukui, Kashiba (JP); Kei Sumimoto, Yao (JP); Mitsumoto Inoguchi, Toyota (JP); Hiroyuki Shinoda, Nisshin (JP); Masahiro Kimura, Toyota (JP)

(73) Assignees: JTEKT CORPORATION, Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 480 days.

(21) Appl. No.: 16/629,662

(22) PCT Filed: Jul. 10, 2018

(86) PCT No.: PCT/JP2018/026022
§ 371 (c)(1),
(2) Date: Jan. 9, 2020

(87) PCT Pub. No.: WO2019/013203
PCT Pub. Date: Jan. 17, 2019

(65) Prior Publication Data
US 2020/0158180 A1     May 21, 2020

(30) Foreign Application Priority Data

Jul. 14, 2017 (JP) .............................. JP2017-138106

(51) Int. Cl.
*B21J 9/02* (2006.01)
*B21D 53/10* (2006.01)
(Continued)

(52) U.S. Cl.
CPC ............ *F16C 43/045* (2013.01); *B21D 53/10* (2013.01); *B21J 9/02* (2013.01); *F16C 19/08* (2013.01); *F16C 23/06* (2013.01); *B21J 9/06* (2013.01)

(58) Field of Classification Search
CPC ..... B21J 9/06; B21J 9/025; B21J 9/02; B21D 53/10
See application file for complete search history.

(56) References Cited

U.S. PATENT DOCUMENTS

| | | | |
|---|---|---|---|
| 6,443,622 B1 | 9/2002 | Webb et al. | |
| 10,914,340 B2 * | 2/2021 | Kikuchi | B21D 39/00 |

(Continued)

FOREIGN PATENT DOCUMENTS

| | | |
|---|---|---|
| CN | 104550607 A | 4/2015 |
| DE | 10017462 A1 | 10/2001 |

(Continued)

OTHER PUBLICATIONS

Machine Translation of DE 10 2012 009545 A1 (Year: 2013).*
(Continued)

*Primary Examiner* — Christopher J Besler
(74) *Attorney, Agent, or Firm* — Oliff PLC (57) ABSTRACT

A manufacturing device manufactures a bearing unit including an inner ring member outwardly fitted onto an end portion of a shaft main body of an inner shaft on one side in an axial direction and fixed by a swaged portion extending from the end portion. The manufacturing device includes: a rotating mechanism including a rotor which holds the other side of the inner shaft in the axial direction from below and (Continued)

rotates the inner shaft about a center axis of the inner shaft while the center axis is aligned with an up-down direction, the rotor being mounted below a processing area of the bearing unit; and a swaging mechanism mounted above the processing area and including a punch which is brought into contact with the swaged portion to plastically deform the swaged portion.

3 Claims, 10 Drawing Sheets

(51) Int. Cl.
*B21J 9/06* (2006.01)
*F16C 43/04* (2006.01)
*F16C 19/08* (2006.01)
*F16C 23/06* (2006.01)

(56) References Cited

U.S. PATENT DOCUMENTS

| | | |
|---|---|---|
| 2001/0020329 A1 | 9/2001 | Webb et al. |
| 2002/0085781 A1 | 7/2002 | Ohkuma et al. |
| 2002/0172439 A1 | 11/2002 | Webb et al. |
| 2002/0174544 A1 | 11/2002 | Webb et al. |
| 2004/0165801 A1 | 8/2004 | Webb et al. |
| 2012/0047740 A1 | 3/2012 | Shirakami et al. |
| 2016/0074928 A1 | 3/2016 | Onizuka |
| 2018/0149206 A1* | 5/2018 | Hagiwara ........... B60B 27/0094 |

FOREIGN PATENT DOCUMENTS

| | | | | |
|---|---|---|---|---|
| DE | 102012009545 A1 | * | 11/2013 | ............ B21J 9/025 |
| JP | 2002-192385 A | | 7/2002 | |
| JP | 2002-250358 A | | 9/2002 | |
| JP | 2003-021153 A | | 1/2003 | |
| JP | 2003028179 A | * | 1/2003 | ............ B21J 9/025 |
| JP | 2012-045612 A | | 3/2012 | |
| JP | 2014-226679 A | | 12/2014 | |
| JP | 2016-060267 A | | 4/2016 | |
| JP | 2016-159337 A | | 9/2016 | |
| KR | 10-1677885 B1 | | 12/2016 | |
| WO | 98/25772 A1 | | 6/1998 | |
| WO | 98/58762 A1 | | 12/1998 | |
| WO | WO-2016194866 A1 | * | 12/2016 | ............ B21J 9/025 |
| WO | WO-2018179192 A1 | * | 10/2018 | ............ B21D 39/00 |

OTHER PUBLICATIONS

Machine Translation of JP 2003-028179 A (Year: 2003).*
May 17, 2021 Office Action issued in Korean Patent Application No. 10-2020-7000692.
Apr. 6, 2021 Office Action issued in Japanese Patent Application No. 2017-138106.
Sep. 25, 2018 Search Report issued in International Patent Application No. PCT/JP2018/026022.
Sep. 25, 2018 Written Opinion of the International Searching Authority issued in International Patent Application No. PCT/JP2018/026022.

* cited by examiner

(OTHER SIDE IN AXIAL DIRECTION)

(ONE SIDE IN AXIAL DIRECTION)

BEARING UNIT MANUFACTURING DEVICE AND BEARING UNIT MANUFACTURING METHOD

TECHNICAL FIELD

An aspect of the present invention relates to a bearing unit manufacturing device and a bearing unit manufacturing method.

BACKGROUND ART

Figure 8:
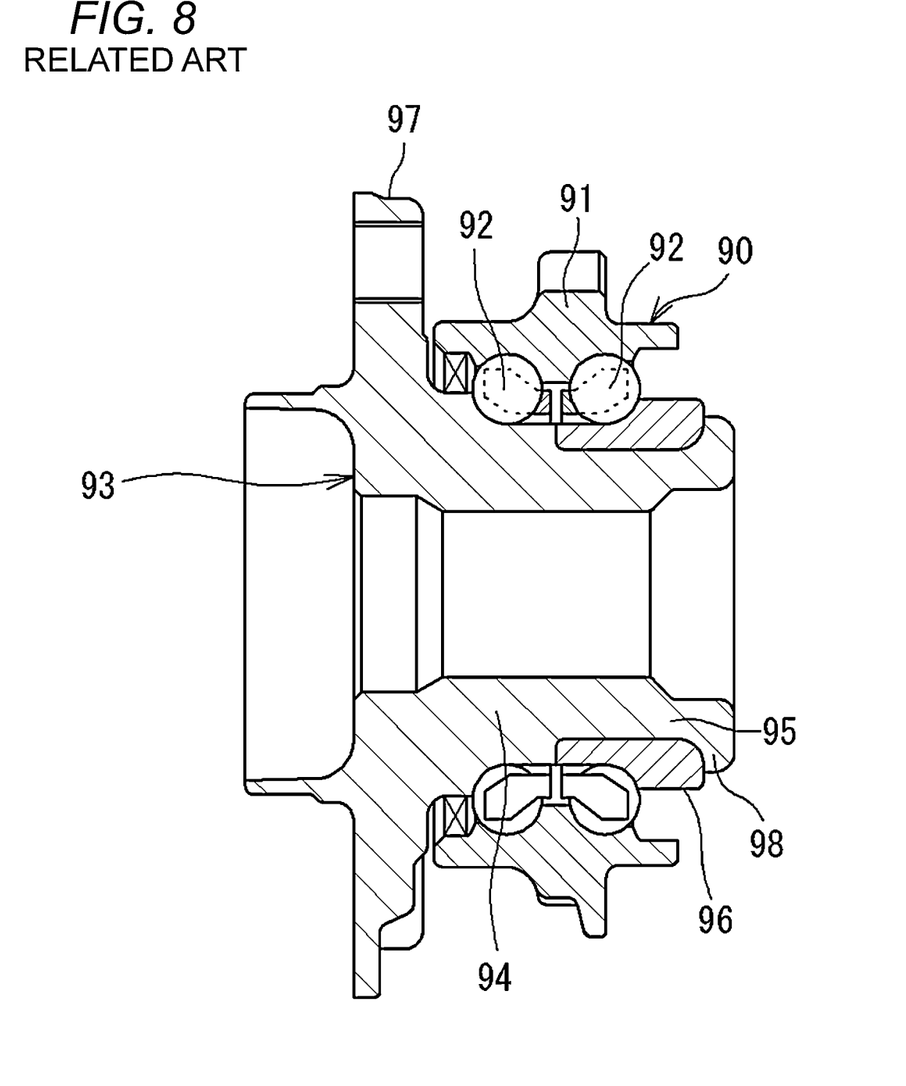
FIG. 8 is a cross-sectional view of a hub unit for describing a related art.

In an automobile, a hub unit (bearing unit) is used in order to rotatably support a vehicle wheel at a suspension of a vehicle body side. As shown in FIG. 8, a hub unit 90 includes an outer ring 91 fixed to a suspension (not shown), and an inner shaft (hub shaft) 93 which is provided on a radially inner side of the outer ring 91 via rolling elements 92. The inner shaft 93 includes a shaft main body 94, and an inner ring member 96 outwardly fitted onto an end portion 95 of the shaft main body 94 on one side in an axial direction. The shaft main body 94 includes a flange portion 97 on the other side in the axial direction, and a wheel or a brake disc of a vehicle wheel (not shown) is mounted to the flange portion 97.

The inner ring member 96 is outwardly fitted onto the end portion 95 of the shaft main body 94, and is prevented from being removed and dropping out from the one side in the axial direction by a swaged portion 98 extended from the end portion 95. The fixing of the inner ring member 96 by the swaged portion 98 is performed, for example, by a manufacturing device shown in Patent Document 1.

Figure 9:
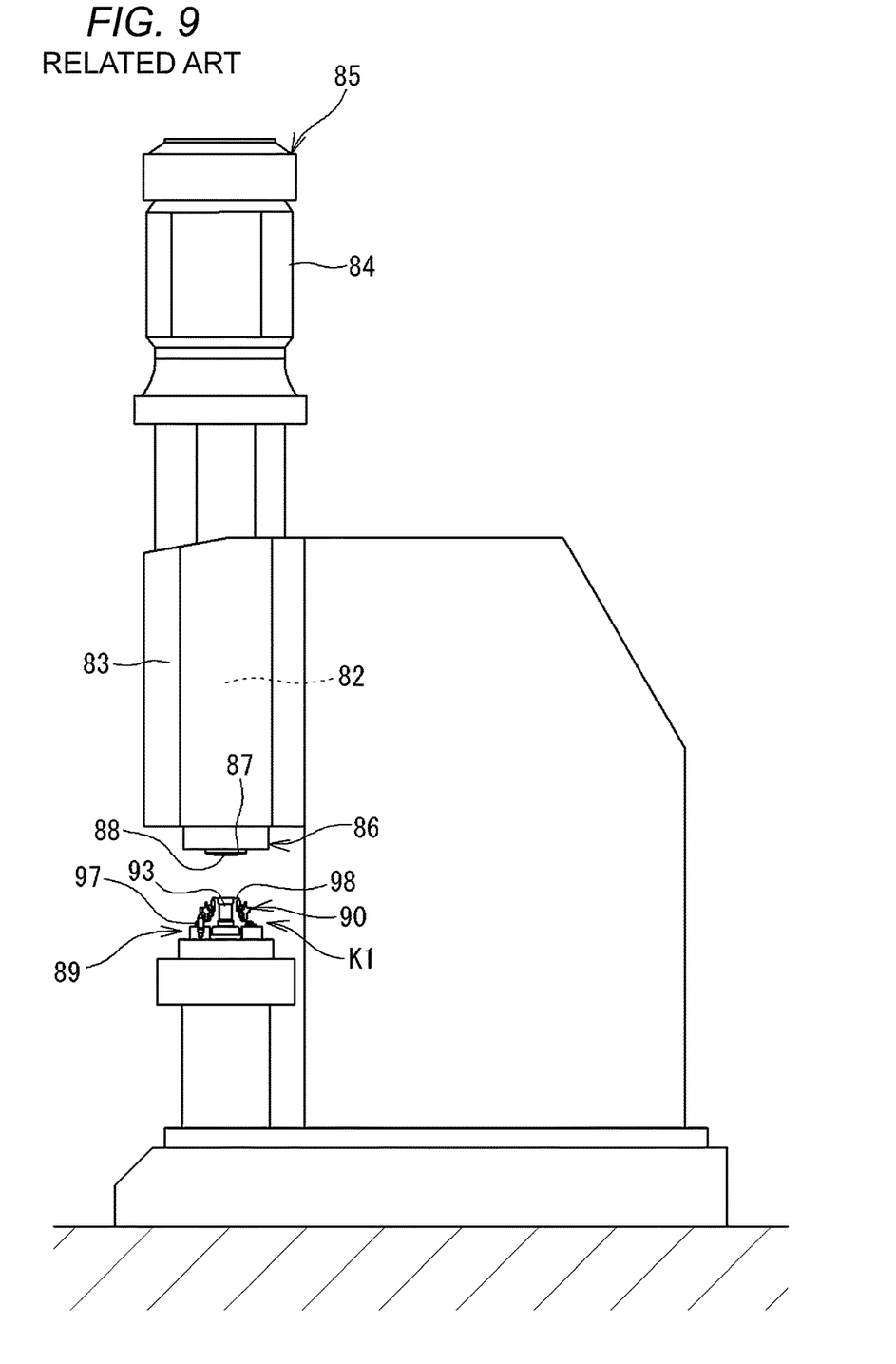
FIG. 9 is a side view of a manufacturing device of a related art.

As shown in FIG. 9, this manufacturing device includes: a fixing stage 89 on which the inner shaft 93 (flange portion 97) of the hub unit 90 is mounted and fixed; a swaging mechanism 86 including a punch 88 which is brought into contact with the swaged portion 98 of the hub unit 90 and plastically deforms the swaged portion 98 and a spindle 87 supporting the punch 88; a rotating mechanism 85 including an electric motor 84 which rotates the spindle 87; and a thrust generating mechanism 83 generating a thrust for pressing the punch 88 to the swaged portion 98. The thrust generating mechanism 83 is configured to include a hydraulic cylinder 82 provided between the electric motor 84 and the swaging mechanism 86, and a hydraulic unit (not shown) which supplies a hydraulic oil to the hydraulic cylinder 82.

Figure 10A:
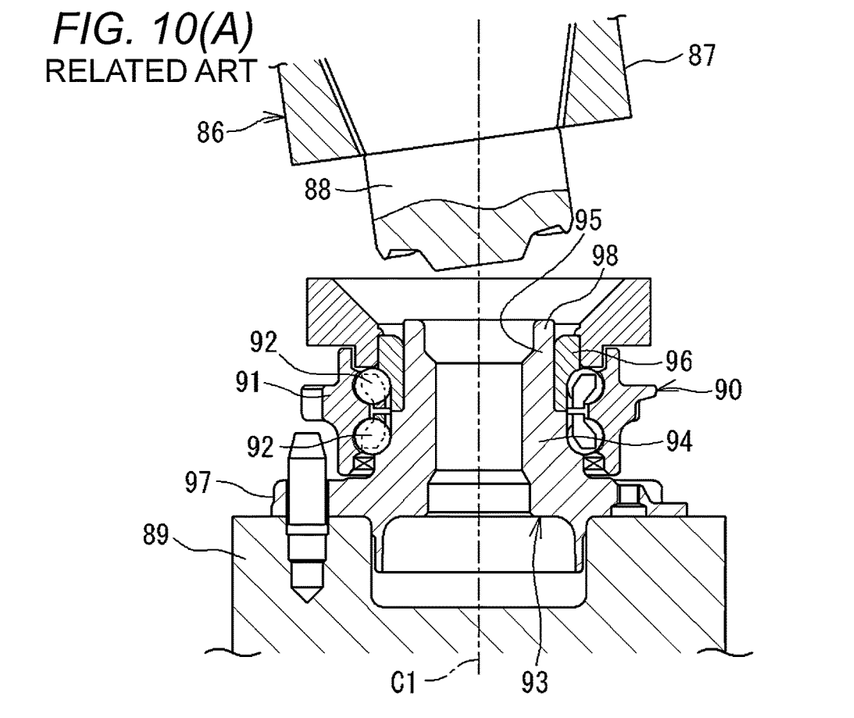
FIGS. 10(A) and 10(B) are explanatory views showing a process of fixing an inner ring member to a shaft main body by a swaged portion using a manufacturing device of a related art.
Figure 10B:
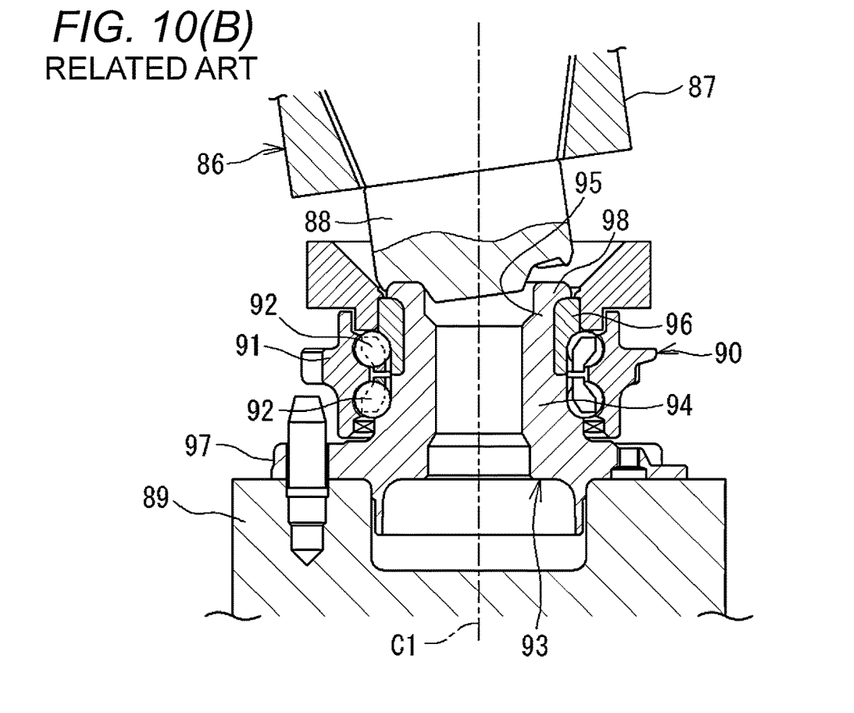

FIGS. 10(A) and 10(B) are explanatory views showing a process of fixing the inner ring member 96 to the shaft main body 94 by the swaged portion 98 using the manufacturing device. First, the inner shaft 93 is fixed to the fixing stage 98. As shown in FIG. 10(A), before the processing, the swaged portion 98 has a shape of cylinder extending in the axial direction from the end portion 95 of the shaft main body 94 with a center axis C1 of the shaft main body 94 as a center. Then, the swaging mechanism 86 approaches (is descended to) the hub unit 90 which has been fixed to the fixing stage 89, and the punch 88 is brought into contact with the swaged portion 98 while rotating the spindle 87 about the center axis C1 using the electric motor 84 (see FIG. 9). Hereupon, as shown in FIG. 10(B), the swaged portion 98 having a shape of cylinder is pressed by the punch 88, so that its diameter is gradually expanded. The inner ring member 96 is restricted shaft main body in the axial direction by the swaged portion 98 whose diameter has been expanded as described above and is fixed to the shaft main body 94.

RELATED ART DOCUMENT(S)

Patent Document(s)

Patent Document 1: JP-A-2012-45612

SUMMARY OF THE INVENTION

Problem to be Solved by the Invention

As shown in FIG. 9, in the manufacturing device of the related art, the swaging mechanism 86 is provided above the hub unit 90 fixed to the fixing stage 89, and further, the hydraulic cylinder 82 of the thrust generating mechanism 83 and the rotating mechanism 85 including the electric motor 84 are provided thereabove. Therefore, when a processing area K1 on the fixing stage 89 is set at a height (for example, a height of 1 m from the floor) to facilitate a work of an operator such as setting the hub unit 90 on the manufacturing device or taking out the processed hub unit 90, there is a problem that the entire size of the device in height becomes large, thereby leading to the increase in size of the manufacturing device.

Therefore, an aspect of the present invention is to provide a manufacturing device capable of achieving the reduction in size, and a method for manufacturing a bearing unit by the manufacturing device which has achieved the reduction in size.

Means for Solving the Problem

In an aspect of the present invention, there is provided a bearing unit manufacturing device for manufacturing a bearing unit, the bearing unit including an outer ring and an inner shaft disposed on a radially inner side of the outer ring via a rolling element, the inner shaft including a shaft main body and an inner ring member which is outwardly fitted onto an end portion of the shaft main body on one side in an axial direction and fixed by a swaged portion extending from the end portion, the bearing unit manufacturing device including: a rotating mechanism including a rotor which holds the other side of the inner shaft in the axial direction from below and rotates the inner shaft about a center axis of the inner shaft while the center axis is aligned with an up-down direction, the rotor being mounted below a processing area of the bearing unit; and a swaging mechanism mounted above the processing area and including a punch which is brought into contact with the swaged portion to plastically deform the swaged portion.

According to this manufacturing device, when the processing area of the bearing unit is set at a height to facilitate a work of an operator such as setting the bearing unit on the manufacturing device or taking out the processed bearing unit, the rotor is positioned below the processing area, and the swaging mechanism is positioned above the processing area, whereby it is possible to reduce the size of the manufacturing device in height so as to be less than that of the related art and to make the manufacturing device smaller.

Preferably, the manufacturing device further includes a thrust generating mechanism which generates a thrust for pressing the punch to the swaged portion, and the thrust generating mechanism includes an electric motor and a linear actuator which outputs a rotating force of the electric motor as an axial force. The thrust generating mechanism may be constituted by hydraulic equipment including a hydraulic unit and a hydraulic cylinder, but electric power consumption is smaller when the thrust generating mechanism is configured to have the electric motor and the linear actuator reduces electricity consumption. That is, in a case where the hydraulic equipment is employed, the electric power consumption becomes large since it is necessary to actuate the hydraulic unit even during an idling time when the processing of the swaged portion is not actually performed, whereas, in a case where the electric motor is employed, such an electric power consumption that is caused by flowing a standby current is sufficient during the idling time, which makes it possible to save energy.

Preferably, the linear actuator is provided in a region adjacent to the fixed spindle in a horizontal direction of the fixed spindle. In this case, the linear actuator and the fixed spindle are configured to be provided in parallel to each other, and it is possible to further effectively prevent the manufacturing device from becoming tall and increasing in size.

Preferably, the swaging mechanism further includes: a fixed spindle whose rotation is constrained; and a bearing portion which supports the punch to be rotatable about a center axis of the punch with respect to the fixed spindle. In this case, when the punch is brought into contact with the inner shaft (swaged portion) while the inner shaft is rotated by the rotating mechanism, the punch is rotated accompanying the inner shaft which is rotated, and thus it becomes possible to perform smoothly the plastic deformation of the swaged portion by the punch.

In another aspect of the present invention, there is provided a bearing unit manufacturing method for manufacturing a bearing unit, the bearing unit including an outer ring and an inner shaft disposed on a radially inner side of the outer ring via a rolling element, the inner shaft including a shaft main body and an inner ring member which is outwardly fitted onto an end portion of the shaft main body on one side in an axial direction and fixed by a swaged portion extending from the end portion, the bearing unit manufacturing method including: rotating a rotor about a center axis of the inner shaft in a state in which the rotor holds the other side of the inner shaft in the axial direction from below while the center axis is aligned with an up-down direction; and plastically deforming the swaged portion by bringing a punch into contact with the swaged portion from above.

According to this manufacturing method, the swaging processing is performed while the punch is installed above a processing area of the bearing unit and the rotor for rotating the inner shaft is installed below the processing area. As a result, when the processing area is set at a height to facilitate a work of an operator such as setting the bearing unit on the manufacturing device or taking out the processed bearing unit, the rotor is positioned below the processing area, and the swaging mechanism is positioned above the processing area, whereby it is possible to reduce the size of the manufacturing device in height so as to be less than that of the related art and to make the manufacturing device smaller.

Advantages of the Invention

According to aspects of the present invention, it is possible to reduce the size of the manufacturing device in height so as to be less than that of the related art, and it becomes possible to achieve the reduction in size of the manufacturing device.

Further, it is possible to manufacture a bearing unit (perform the swaging processing of the swaged portion) by the manufacturing device which has achieved the reduction in size.

MODE FOR CARRYING OUT THE INVENTION

Figure 1:
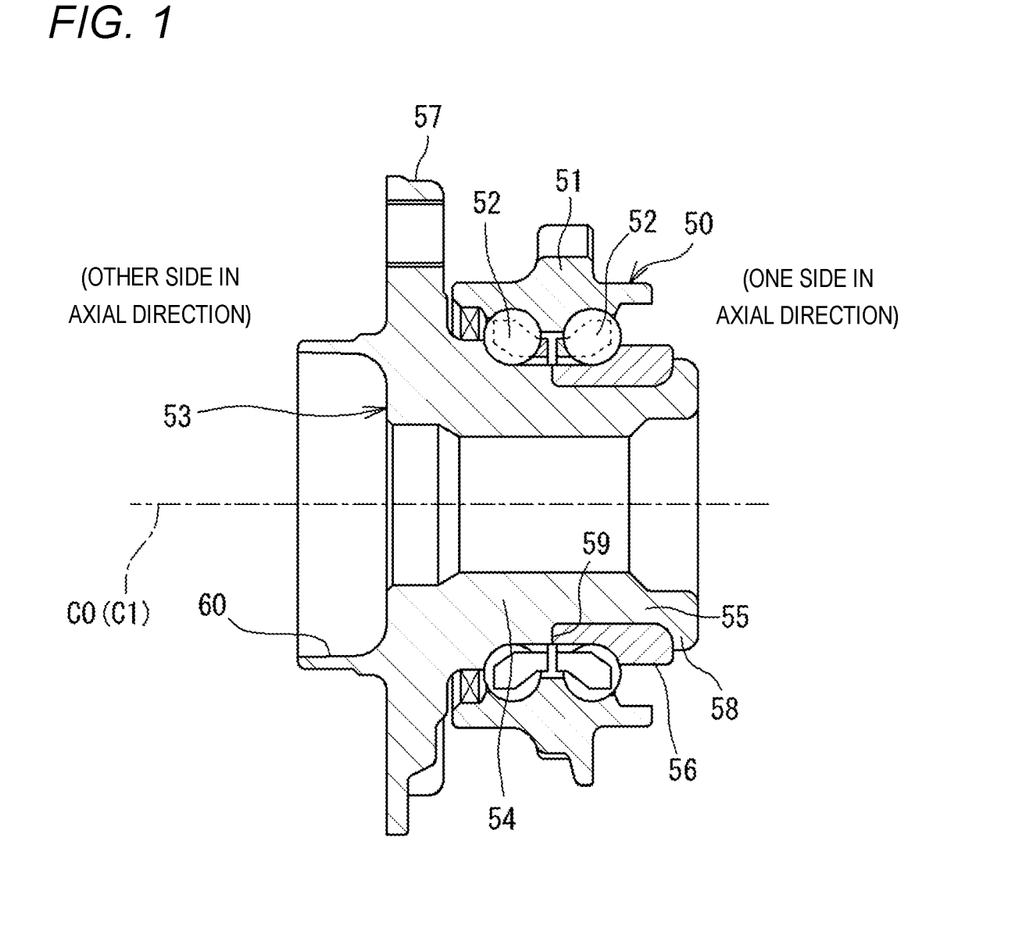
FIG. 1 is a cross-sectional view showing an example of a bearing unit manufactured by a manufacturing device according to an embodiment of a present invention.

FIG. 1 is a cross-sectional view showing an example of a bearing unit manufactured by a manufacturing device according to an embodiment of a present invention. The bearing unit shown in FIG. 1 is a unit for rotatably supporting a vehicle wheel to a suspension device of a vehicle body side in a vehicle, and is called as a hub unit. Hereinafter, the bearing unit which is manufactured will be described while being called as the hub unit 50. The hub unit 50 includes an outer ring 51 fixed to the suspension device (not shown), and an inner shaft (hub shaft) 53 disposed on a radially inner side of the outer ring 51 via two rows of balls (rolling element) 52. The inner shaft 53 includes a shaft main body 54, and an inner ring member 56 outwardly fitted onto an end portion 55 of the shaft main body 54 on one side in an axial direction (right side in FIG. 1). The shaft main body 54 includes a flange portion 57 on the other side in the axial direction (on the left side in FIG. 1), and a wheel or a brake disc of the vehicle wheel (not shown) is attached to the flange portion 57.

The shaft main body 54 includes a stepped surface 59 facing toward the one side in the axial direction and provided at its middle portion in the axial direction. The stepped face 59 is formed in an annular shape, and a portion (an end portion 55) of the shaft main body 54 located further to the one side in the axial direction than this stepped face 59 (excluding a swaged portion 58) has a smaller outer diameter. The inner ring member 56 is outwardly fitted onto this end portion 55 while the inner ring member is in contact with the stepped face 59. Further, the inner ring member 56 is prevented from being removed and dropping out in the one side of the axial direction by the swaged portion 58 which is extended toward a radially outside from the end portion 55. Therefore, the inner ring member 56 is fixed to the shaft main body 54 by being interposed in the axial direction between the stepped face 59 and the swaged portion 58. The fixing of the inner ring member 56 by such swaged portion 58 is performed by the manufacturing device 10 shown in FIG. 3.

Figure 2:
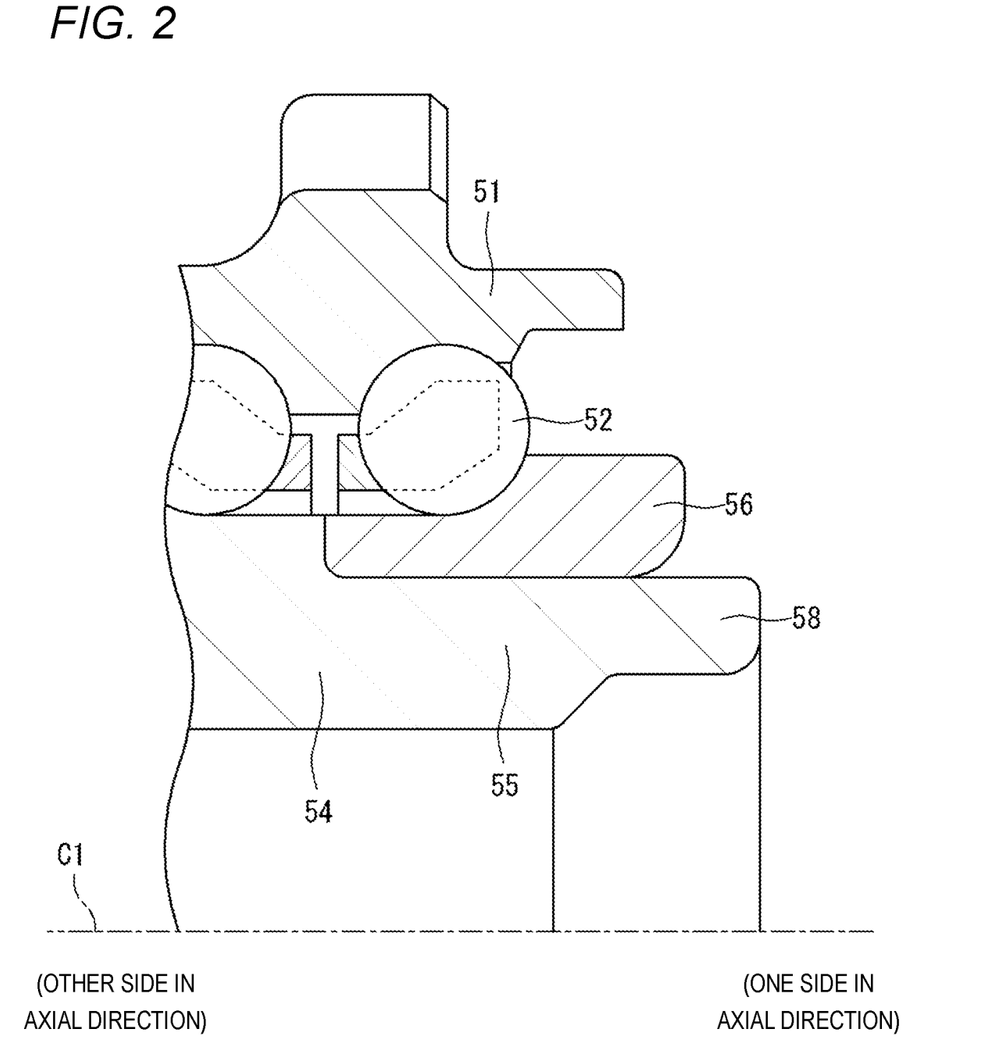
FIG. 2 is a cross-sectional view showing a portion of the bearing unit (hub unit).

The hub unit 50 before the fixing of the inner ring member 56 to the shaft main body 54 by the manufacturing device 10 (intermediate product) is, as shown in FIG. 2, in a state where the outer ring 51 is assembled outwardly onto the shaft main body 54 in the radial direction with the balls 52 interposed therebetween and the swaged portion 58 extends in the axial direction from the end portion 55 of the shaft main body 54 on the one side in the axial direction to have a cylindrical shape with a center axis C1 of the shaft main body 54 as its center. Then the inner ring member 56 is outwardly fitted onto this end portion 55. From this state, a punch 27 (see FIG. 7) to be described below is brought into contact with the swaged portion 58 of a cylindrical shape, and then causes the swaged portion 58 to be plastically deformed (increase the diameter). Therefore, the inner ring member 54 can be fixed to the inner ring member 56.

Figure 3:
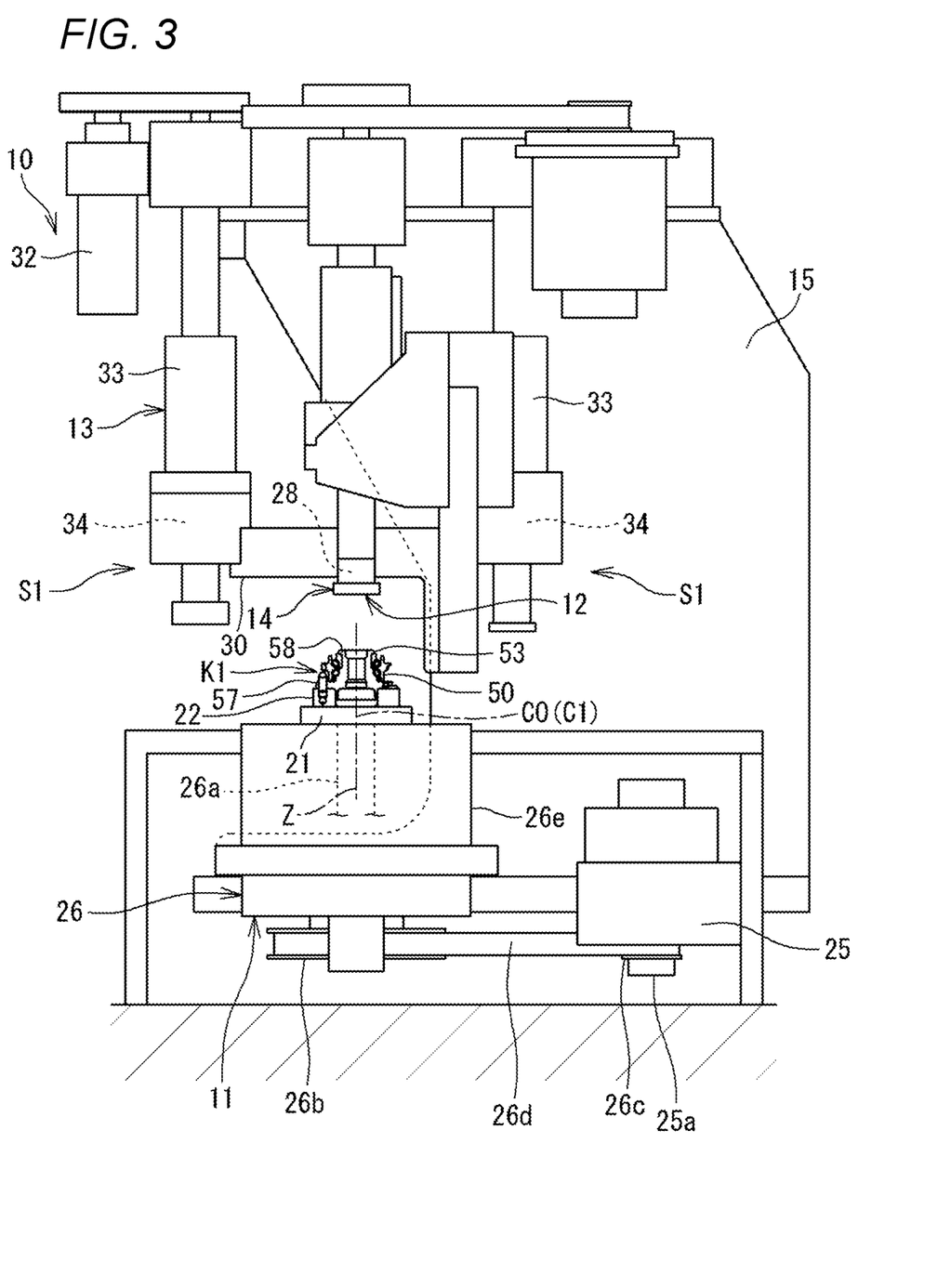
FIG. 3 is a side view showing an example of a manufacturing device according to an embodiment of a present invention.

FIG. 3 is a side view showing an example of the manufacturing device according to the embodiment of the present invention. The manufacturing device 10 includes a rotating mechanism 11 and a swaging mechanism 12. Further, the manufacturing device 10 of the embodiment includes a thrust generating mechanism 13 and a constraint mechanism 14. The rotating mechanism 11, the swaging mechanism 12, the thrust generating mechanism 13, and the constraint mechanism 14 are mounted on a device frame 15 which is installed on a floor surface. In this manufacturing device 10, a processing area (installation area) K1 of the hub unit 50 (intermediate product) is set at a height (for example, 1 m from the floor) to facilitate a work of an operator such as setting the hub unit 50 (intermediate product) on the manufacturing device or taking out the hub unit 50 which has been processed.

In the manufacturing device 10, the hub unit 50 (intermediate product) is mounted on a rotor 21 which the rotating mechanism 11 has, with a posture where a center axis C0 of the inner shaft 53 lies along an up-down direction with the swaged portion 58 upward and the flange portion 57 downward. The rotating mechanism 11 includes an electric motor 25 and a power transmission unit 26 besides the rotor 21 on which the hub unit 50 is placed and fixed, wherein the rotating force of the electric motor 25 is transmitted to the rotor 21 through the power transmission unit 26, and the rotor 21 rotates about a reference axis (reference line) Z of the up-down direction. The hub unit 50 is mounted on the rotor 21 with the center axis C0 of the inner shaft (the center axis C1 of the shaft main body 54) aligned with the reference axis Z. The power transmission unit 26 can be constituted by a pulley or a belt, or constituted by gears, and has a function of decreasing a speed of rotation of the electric motor 25.

Figure 4:
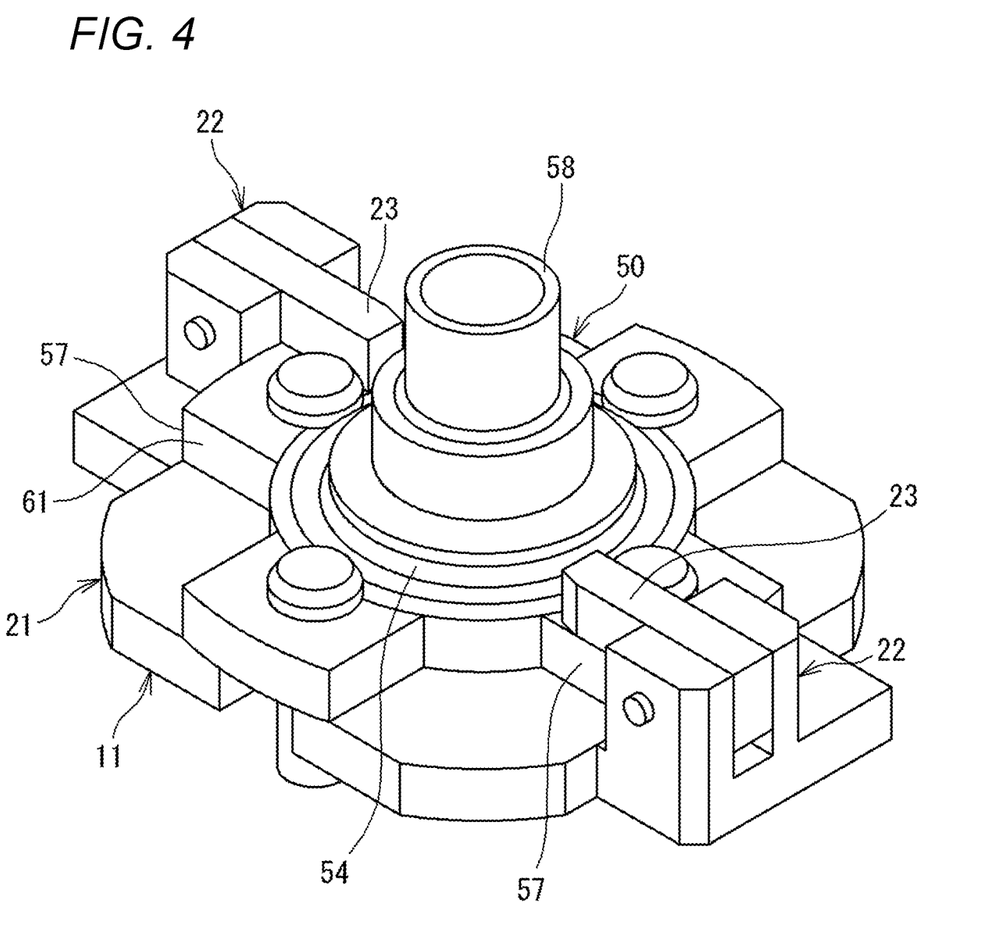
FIG. 4 is a perspective view of a hub unit mounted on a rotor.

FIG. 4 is a perspective view of the hub unit 50 mounted on the rotor 21. Further, in FIG. 4, the outer ring 51, the balls 51 and the inner ring member 56 of the hub unit 50 are omitted for convenience of explanation. The rotating mechanism 11 includes a fixing unit 22 for fixing the hub unit 50 to the rotor 21. The fixing unit 22 shown in FIG. 4 includes a clamping member 23 which clamps the flange portion 57 of the shaft main body 54 between the rotor 21 and the clamp member in the up-down direction. With this configuration, it becomes possible to fix the shaft main body 54 to the rotor 21 and rotate the shaft main body 54 as one body with the rotor 21 even when the flange portion 57 has a cross shape as shown in FIG. 4 other than a circular shape.

Figure 5:
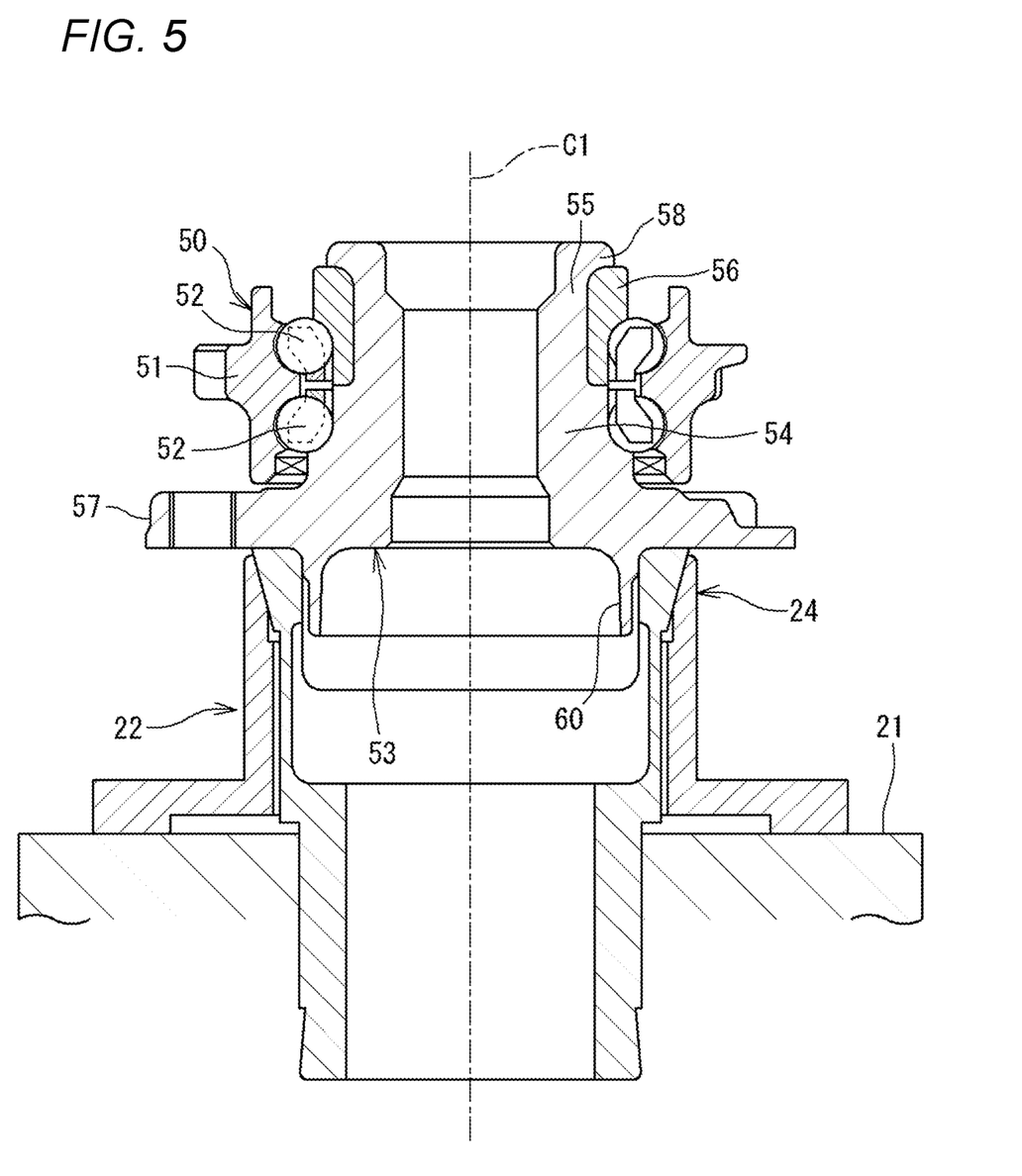
FIG. 5 is an explanatory view showing a modification example of a fixing unit.

FIG. 5 is an explanatory view showing a modification example of the fixing unit 22. The shaft main body 54 of the tub unit 50 includes a cylindrical portion 60 protruding in the axial direction in an inner circumference side portion of the flange portion 57. The cylindrical portion 60 has a cylindrical shape with the center axis C1 of the shaft main body 54 as the center, and is integrated with the shaft main body 54. Then, the fixing unit 22 shown in FIG. 5 includes a chuck (collet chuck) 24 provided to be rotatable as one body with the rotor 21, and this chuck 24 fixes the shaft main body 54 to the rotor 21 by being put on the cylindrical portion 60 from the radial direction. As a result, it becomes possible to rotate the shaft main body 54 and the rotor 21 as one body.

The fixing unit 22 can have a configuration other than that shown in FIGS. 4 and 5. For example, when the flange portion 57 has a cross shape (see FIG. 4), a pin member (not shown) which is integrated with the rotor 21 may be additionally provided to the said configuration, so that the rotating force of the rotor 21 is transmitted to the shaft main body 54 via the pin member by bringing the pin member in contact with a side surface 61 of the flange portion 57. Alternatively, the pin member which is integrated with the rotor 21 may be configured to be inserted through a hole (for example, a hole for work) (not shown) formed in the flange portion 57, so that the rotating force of the rotor 21 is transmitted to the shaft main body 54 via the pin member.

As described above, the rotating mechanism 11 (see FIG. 3) includes the rotor 21, and the rotor 21 holds the other side of the inner shaft 53 in the axial direction (the flange portion 57 side) from below while the center axis C0 of the inner shaft 53 of the hub unit 50 is aligned with the up-down direction. The rotor 21 can rotate the inner shaft 53 around the center axis C0 by rotating itself. And the rotor 21 is installed below the processing area K1 of the hub unit 50. In the embodiment, the electric motor 25 and the power transmission unit 26 for rotating the rotor 21 around the reference axis Z are also installed at a region lower than the processing area K1.

Figure 6:
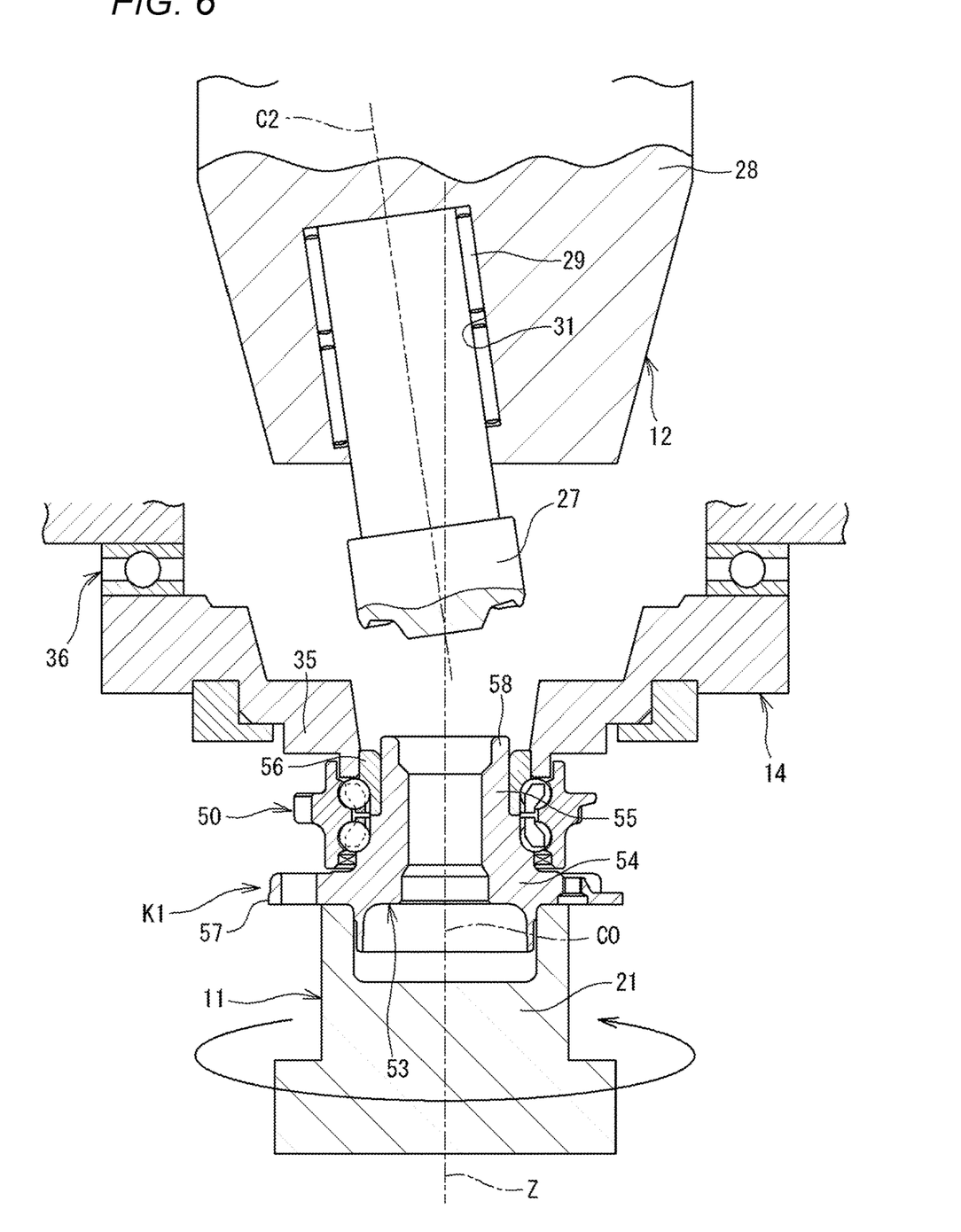
FIG. 6 is an explanatory view showing a hub unit fixed on a rotor, a swaging mechanism, and a constraint mechanism.
Figure 7:
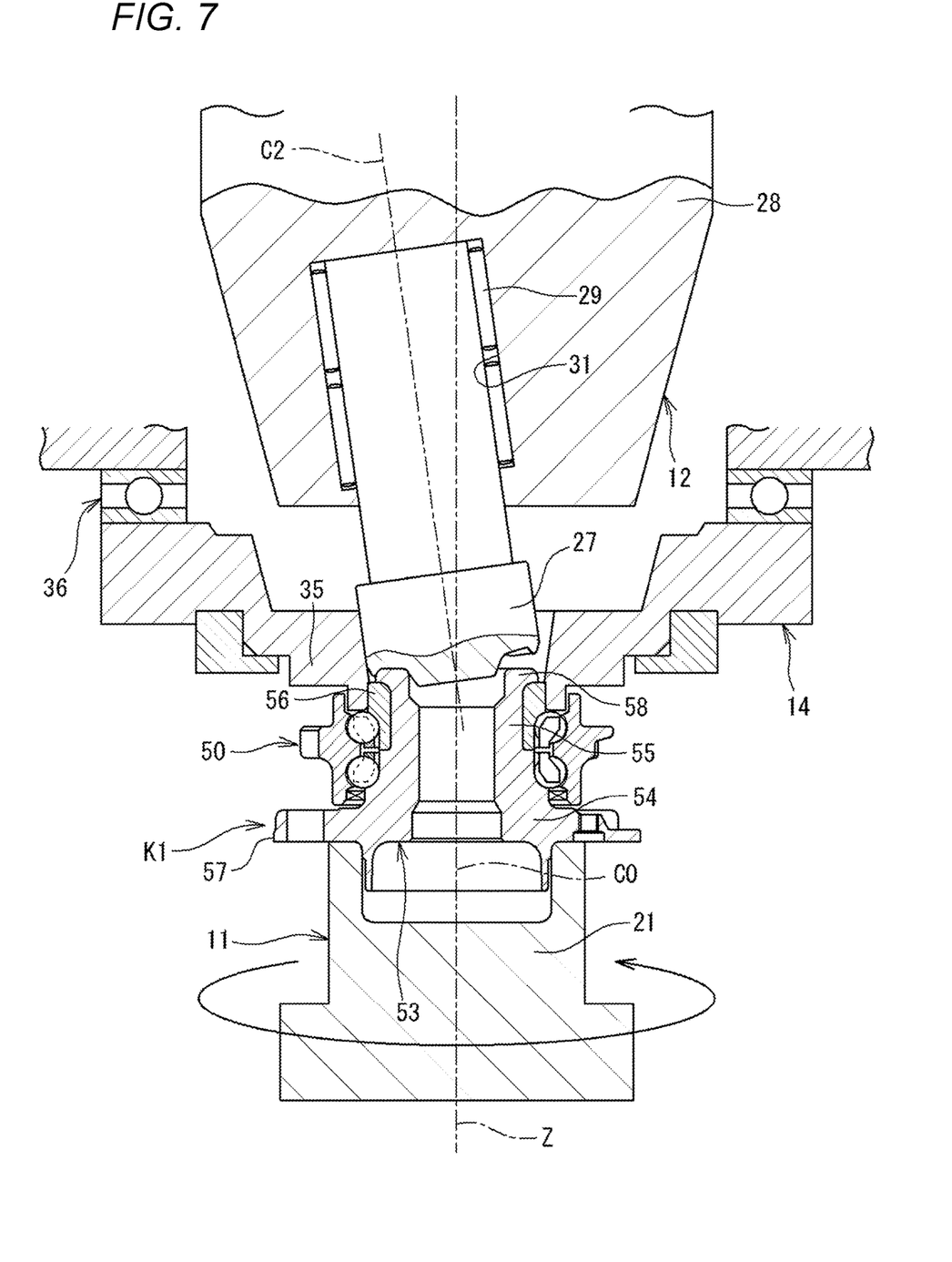
FIG. 7 is an explanatory view showing a hub unit fixed on a rotor, a swaging mechanism, and a constraint mechanism.

FIGS. 6 and 7 are explanatory views showing the hub unit 50 fixed on the rotor 21, the swaging mechanism 12, and the constraint mechanism 14. The swaging mechanism 12 includes the punch 27, the fixed spindle 28, and the bearing portion 29 which supports the punch 27 with respect to the fixed spindle 28. The swaging mechanism 12 is installed above the processing area K1. In FIG. 3, the manufacturing device 10 includes an ascending and descending frame 30 which is supported at a device frame 15 so as to be movable up and down. The fixed spindle 28 shown in FIG. 6 is attached to the ascending and descending frame 30, and the fixed spindle 28 is ascended and descended by a linear actuator 33 of a thrust generating mechanism 13 (see FIG. 3) to be described below.

In FIG. 6, the fixed spindle 28 is configured by a column-shaped member whose center is set at the reference axis (reference line) Z of the manufacturing device 10. The fixed spindle 28 can be moved in the up-down direction together with the ascending and descending frame 30, but its rotation is constrained by the ascending and descending frame 30 and the device frame 15. That is, the fixed spindle 28 is movable in the up-down direction along the reference axis Z, but cannot be rotated about the reference axis Z. In the fixed spindle 28, a hole 31 open downward is formed. A center axis (center line) C2 of the hole 31 is inclined at a predetermined angle with respect to the reference axis Z. The punch 27 of a column shape is provided in the hole 31 with the bearing portion 29 interposed therebetween. The bearing portion 29 is a rolling bearing, and can support the punch 27 with respect to the fixed spindle 28, thereby allowing the punch to be rotatable about the center axis (C2). The center axis C2 of the hole 31 becomes the center axis of the punch 27, and the punch 27 can be freely rotated (spinning) about the center axis C2.

In FIG. 3, the thrust generating mechanism 13 is configured to have an electric motor (servo motor) 32, and the linear actuator 33 which outputs the rotating force of the electric motor 32 as an axial force. The linear actuator 33 of the embodiment is one having a ball screw mechanism, and the linear actuator 33 is mounted on the device frame 15 with a linear operation direction of the linear actuator 33, that is, a longitudinal direction of the ball screw mechanism as the up-down direction. The ascending and descending frame 30 is attached to a nut unit (movable unit) 34 in which this ball screw mechanism (linear actuator 33) is mounted. When the electric motor 32 is rotated in one direction, the nut unit 34 is descended, and thus it is possible to descend the swaging mechanism 12. When the electric motor 32 is rotated in the other direction, the nut unit 34 is ascended, and thus it is possible to ascend the swaging mechanism 12. In the embodiment, the linear actuator 33 (ball screw mechanism) is provided in a region S1 adjacent to the fixed spindle 28 in the horizontal direction of the fixed spindle 28 as shown in FIG. 3.

As described above, the thrust generating mechanism 13 can position the swaging mechanism 12 at a waiting position above the processing area K1 by ascending the ascending and descending frame 30 (state shown in FIG. 6), and can also position the swaging mechanism 12 at a processing position in which the punch 27 is in contact with the swaged portion 58 of the hub unit 50, by descending the ascending and descending frame 30 (state shown in FIG. 7). Further, the thrust generating mechanism 13 can apply a force directed downward to the swaging mechanism 12, and thereby it becomes possible to generate a thrust for pressing the punch 27 onto the swaged portion 58.

In FIG. 7, when the punch 27 plastically deforms the swaged portion 58, the end portion 55 of the shaft main body 54 is subjected to a force directed outward in a radial direction through the swaged portion 58, and thus the end portion 55 presses the inner ring member 56 outward in the radial direction. As a result, the inner ring member 56 has a tendency to be deformed in a diameter expansion direction. The constraint mechanism 14 suppresses such deformation. The constraint mechanism 14 includes a ring member 35 which is brought in contact with a portion of outer circumferential surface of the inner ring member 56. The ring member 35 has a high stiffness, and prevents the deformation of the inner ring member 56. Further, since the shaft main body 54 and the inner ring member 56 of the hub unit 50 are rotated by the rotating mechanism 11, the ring member 35 is also made freely rotatable. As a result, the constraint mechanism 14 includes a rolling bearing 36 which rotatably supports the ring member 35. The constraint mechanism 14 is also configured to be ascended and descended, and descends the ring member 35 to be fitted onto the inner ring member 56 when the hub unit 50 is fixed to the processing area K1.

Processing of the swaged portion 58 of the hub unit 50 (shaft end swaging processing) performed by the manufacturing device 10 configured as describe above will be described. The hub unit 50 is fixed on the rotor 21 as shown in FIG. 6, the swaging mechanism 12 is descended from the waiting position, and the rotor 21 (hub unit 50) is rotated about the center axis C0. The punch 27 is descended with an inclined state, and is not rotated until being brought into contact with the swaged portion 58. The swaging mechanism 12 continues to be descended, and when the punch 27 is brought into contact with the swaged portion 58, the punch 27 in contact with the swaged portion 58 is rotated accompanying (performs the accompanying rotation of) the shaft main body 54 with the center axis C2 as a center since the hub unit 50 (shaft main body 54) is rotated together with the rotor 21. After the punch 27 is brought into contact with the swaged portion 58, the thrust generating mechanism 13 (see FIG. 3) causes the punch 27 to press the swaged portion 58. The punch 27 presses the swaged portion 58 which is rotated while the shaft main body 54 continues to be rotated, and thus the swaged portion 58 which has been in the cylindrical shape (see FIG. 2) is gradually and plastically deformed to expand its diameter (see FIG. 7).

In the swaging mechanism 12 of the embodiment, the punch 27 is supported so as to be rotatable about the center axis C2 by the bearing portion 29 configured with the rolling bearing with respect to the fixed spindle 28 which is in a rotation-constrained state. Therefore, when the punch 27 is brought into contact with the inner shaft 53 (swaged portion 58 of the shaft main body 54) while the inner shaft 53 (shaft main body 54) is rotated by the rotating mechanism 11, as described above, the punch 27 is rotated accompanying the inner shaft 53 which is rotated. As a result, it is possible to perform smoothly the plastic deformation of the swaged portion 58 by the punch 27 which is rotated.

And even though the diameter expansion of the swaged portion 58 induces a tendency to expand the diameter of the inner ring member 56, the ring member 35 of the constraint mechanism 14 is fitted onto a portion of the inner ring member 56 and prevents the deformation of the inner ring member 56. With this configuration, the inner ring member 56 is fixed to the shaft main body 54 by the swaged portion 58 whose leading end has been subjected to the diameter expansion.

As described above, in the manufacturing method of the hub unit 50 performed by the manufacturing device 10 of the embodiment, the center axis C0 of the inner shaft 53 of the hub unit 50 is aligned with the up-down direction, the flange portion 57 side (the other side in the axial direction) of the inner shaft 53 is held from the bottom, the rotor 21 is rotated about the center axis C0 (see FIG. 6), and the punch 27 is brought into contact with the swaged portion 58 from the above, so that the swaged portion 58 is plastically deformed (see FIG. 7). According to this manufacturing method, the swaging processing is preformed while the punch 27 is installed above the processing area K1 of the hub unit 50 and the rotor 21 for rotating the inner shaft 53 of the hub unit 50 is installed below the processing area K1. Therefore, when the processing area K1 is set at a height (for example, height of 1 m from the floor) to facilitate a work of an operator such as setting the hub unit 50 in the manufacturing device 10 or taking the processed hub unit 50 out, the rotor 21 is positioned below the processing area K1, and the swaging mechanism 12 is positioned above the processing area K1. As a result, it is possible to reduce the size of the manufacturing device 10 in height so as to be less than that of the related art (see FIG. 9), and to make the manufacturing device 10 smaller.

In the embodiment, the linear actuator (ball screw mechanism) 33 included in the thrust generating mechanism 13 is provided at the region S1 adjacent to the fixed spindle 28 of the rotating mechanism 11 in the horizontal direction. As a result, the linear actuator 33 and the fixed spindle 28 are configured to be provided in parallel to each other. Accordingly, it is possible to further effectively prevent the manufacturing device 10 from becoming tall and increasing in size.

The thrust generating mechanism 13 of the embodiment is configured to include the electric motor 32 and the linear actuator 33. The thrust generating mechanism 13 may be configured with a hydraulic equipment including a hydraulic cylinder and a hydraulic unit, and however the electric power consumption becomes large in this case since it is necessary to actuate the hydraulic unit even during an idling time when the processing of the swaged portion 58 of the hub unit 50 is not actually performed. However, in the Embodiment, the thrust generating mechanism 13 includes the electric motor 32 as the power source, and thus such an electric power consumption that is caused by flowing a standby current is sufficient during the idling time, which makes it possible to save energy.

In the rotating mechanism 11 of the Embodiment, a first pulley 26b is attached to a lower portion of an output shaft 26a of the power transmission unit 26 connected with the rotor 21. Further, a second pulley 26c is attached to an output shaft 25a of the electric motor 25. A belt 26d is stretched around these pulleys 26b and 26c, and the electric motor 25 is disposed adjacent a housing 26e which supports the output shaft 26a, in the horizontal direction. With this arrangement, the height of the rotating mechanism 11 can be suppressed, which contributes to reduction in size of the manufacturing device 10.

The embodiments disclosed as the above are examples in all points and are not construed as a limitation. That is, the manufacturing device of the invention is not limited to the embodiments shown in the drawings, and may be different embodiments within the scope of the invention. For example, the rotating mechanism 11 may have a configuration other than the illustrated one.

This application is based on Japanese Patent Application No. 2017-138106 filed on Jul. 14, 2017, the contents of which are incorporated herein by reference.

DESCRIPTION OF REFERENCE SIGNS

10: manufacturing device
11: rotating mechanism
12: swaging mechanism
13: thrust generating mechanism
21: rotor
27: punch
28: fixed spindle
29: bearing portion
32: electric motor
33: linear actuator
50: hub unit (bearing unit)
51: outer ring
52: ball (rolling element)
53: inner shaft
54: shaft main body
55: end portion
56: inner ring member
58: swaged portion
C0: center axis of inner shaft
C1: center axis of shaft main body
C2: center axis
K1: processing area
S1: region

The invention claimed is:

1. A bearing unit manufacturing device for manufacturing a bearing unit, the bearing unit comprising an outer ring and an inner shaft disposed on a radially inner side of the outer ring via a rolling element, the inner shaft comprising a shaft main body and an inner ring member which is outwardly fitted onto an end portion of the shaft main body on a first side in an axial direction and fixed by a swaged portion extending from the end portion, the bearing unit manufacturing device comprising:

a rotating mechanism comprising a rotor configured to hold the inner shaft on a second side opposite to the first side in the axial direction from below and rotate the inner shaft about a center axis of the inner shaft while the center axis is aligned with an up-down direction;

a swaging mechanism comprising a punch configured to be brought into contact with the swaged portion to plastically deform the swaged portion; and a constraint mechanism configured to suppress deformation of the inner ring member in a diameter expansion direction, wherein the rotating mechanism and the swaging mechanism define a processing area above the rotating mechanism and below the swaging mechanism, the processing area being an area in which the bearing unit is to be held and processed, wherein the swaging mechanism further comprises:
a fixed spindle whose rotation is constrained; and
a bearing portion configured to support the punch to be rotatable about a center axis of the punch with respect to the fixed spindle, and wherein the constraint mechanism comprises:
a ring member configured to be brought in contact with a portion of an outer circumferential surface of the inner ring member; and
a rolling bearing configured to rotatably support the ring member of the constraint mechanism;

wherein the ring member of the constraint mechanism is configured to be positioned between the outer circumferential surface of the inner ring member and an inner circumferential surface of the outer ring.

2. The bearing unit manufacturing device according to claim 1, further comprising:
a thrust generating mechanism configured to generate a thrust for pressing the punch to the swaged portion,
wherein the thrust generating mechanism comprises an electric motor and a linear actuator configured to output a rotating force of the electric motor as an axial force.

3. The bearing unit manufacturing device according to claim 2,
wherein the linear actuator is provided in a region adjacent to the fixed spindle in a horizontal direction of the fixed spindle.

* * * * *